United States Patent [19]
Welsch et al.

[11] Patent Number: 5,214,774
[45] Date of Patent: May 25, 1993

[54] SEGMENTED MEMORY TRANSFER AND MESSAGE PRIORITY ON SYNCHRONOUS/ASYNCHRONOUS DATA BUS

[75] Inventors: Gary A. Welsch, Palatine; Donald A. Dorsey, Arlington Heights, both of Ill.

[73] Assignee: Motorola, Inc., Schaumburg, Ill.

[21] Appl. No.: 559,873

[22] Filed: Jul. 30, 1990

[51] Int. Cl.⁵ .............................................. G06F 13/00
[52] U.S. Cl. ..................................... 395/200; 395/325; 395/425; 455/11.1; 455/33.1
[58] Field of Search ............... 364/DIG. 1, DIG. 2; 395/200, 425, 550, 275, 325; 455/11.1, 33.1, 54.1

[56] References Cited

U.S. PATENT DOCUMENTS

| | | |
|---|---|---|
| 4,369,516 | 1/1983 | Byrns . |
| 4,380,060 | 4/1983 | Wilhelm . |
| 4,593,155 | 6/1986 | Hawkins . |
| 4,615,017 | 9/1986 | Finlay et al. ................... 395/325 |
| 4,631,666 | 12/1986 | Harris et al. ................... 395/325 |
| 4,667,191 | 5/1987 | Comroe et al. . |
| 4,680,787 | 7/1987 | Marry . |
| 4,725,836 | 2/1988 | Guidos . |
| 4,742,560 | 5/1988 | Arai . |
| 4,875,230 | 10/1989 | Blair . |

OTHER PUBLICATIONS

"Interface Between Data Terminal Equipment and Data Communication Equipment Employing Serial Binary Data Interchange", ETA Standard RS-232-C, Revision of RS-232-B, Aug. 1969 (Reaffirmed Jun., 1981).
R. E. Fisher, "A Subscriber Set for the Equipment Test" The Bell System Technical Journal, Jan., 1979 pp. 123-143.
HMOS Single Chip Microcomputer Data Book, No. AD11207R1, 1987 pp. 5-1 thru 5-5.
Motorola Semiconductor Technical Data, "8-Bit HMOS Microcomputer" MC68HC811D4, No. BR296, 1986.

Primary Examiner—Robert L. Richardson
Attorney, Agent, or Firm—Raymond A. Jenski

[57] ABSTRACT

Apparatus and method for transferring segmented memory between memory units determines a need for memory transfer and searches a memory unit segment by segment until a valid data record is found. This valid data record is conveyed to another memory unit via the asynchronous mode. If a valid data records is not found within a predetermined amount of time, a message identifying the memory segment last searched is conveyed. If no remaining valid data records are found, a message with no information is conveyed. Priority is given to asynchronous messages.

22 Claims, 12 Drawing Sheets

SEGMENTED MEMORY TRANSFER AND MESSAGE PRIORITY ON SYNCHRONOUS/ASYNCHRONOUS DATA BUS

BACKGROUND OF THE INVENTION

The present invention relates generally to data transfer between components of radiotelephone equipment and more particularly to a serial digital data transmission system layered on a slower synchronous self-clocking digital data transmission system with message queuing, bus control, and segmented memory transfer features that enable cellular radiotelephone subscriber equipment to respond to requests initiated by cellular system fixed equipment that require a fast response.

A synchronous self-clocking digital data transmission system has been described in U.S. Pat. No. 4,369,516. A synchronous/asynchronous data bus system has been described in U.S. patent application Ser. No. 303,214 "Multiplexed Synchronous/Asynchronous Data Bus" filed on Jan. 27, 1989 in behalf of Wilson, et al, now U.S. Pat. No. 4,972,432.

Patent application Ser. No. 303,214 describes an asynchronous data transmission system layered on a slower self-clocking synchronous data transmission system. The asynchronous data transmission system has much faster data transfer capability than the synchronous data transmission system. This is a particularly useful system in applications where the functions of a portable radiotelephone are integrated with a mobile type radiotelephone peripheral. The portable radiotelephone may then take advantage of the superior mobile type characteristics, such as power output, while using a minimal amount of time for the required transfer of data. (An example of a mobile type radiotelephone peripheral is described in U.S. Pat. No. 4,680,787 "Portable Radiotelephone Vehicular Converter and Remote Handset", hereinafter referred to as a "CVC". This portable/mobile integration is accomplished by splitting radiotelephone functions between the CVC peripheral and the portable radiotelephone.

While the asynchronous data transmission offers higher rates of data transfer, it is desirable to retain the synchronous data transmission system because the synchronous data transmission system has inherently better electrical immunity to transmission error in areas of high electrical noise, such as an automobile environment, and produces little electromagnetic interference itself. Moreover, it is desirable that the synchronous digital transmission system continue in use unmodified to avoid retrofitting equipment already in service.

The invention described in the aforementioned U.S. patent application Ser. No. 303,214 solves some of the problems associated with both high rates of data transmission and required noise immunity. Two uses to which this asynchronous/synchronous data bus may be applied are found in U.S. patent application Ser. No. 107,227 "Radio Arrangement Having Two Radios Sharing Circuitry" filed on Oct.9, 1987, now U.S. Pat. No. 5,029,233 in behalf of Metroka and the aforementioned U.S. Pat. No. 4,680,787. There, the common data bus integrates a portable radiotelephone with a CVC peripheral to give the portable radiotelephone user the radiotelephone performance expected in the higher powered CVC mobile.

For radiotelephone systems being planned for the future, it has been found that an even faster data bus than the one described in the U.S. patent application Ser. No. 303,214 is necessary because subscriber radiotelephone units compliant with cellular system regulator requirements must respond to system queries within a much smaller amount of time than is possible using the multiplexed synchronous/asynchronous data bus of U.S. patent application Ser. No. 303,214. One example of such required responses is a response to cellular system challenges by subscriber equipment which some countries specify. These system queries require the subscriber equipment to process large amounts of data and return the proper response to the fixed equipment within a specified amount of time. A unique implementation to meet this type of requirement in a subscriber unit, where the unit is a single portable or mobile radiotelephone, is found in U.S. Pat. application Ser. No. 461,570, "Radiotelephone Controller Configured for Coresident Secure and Nonsecure Modes" filed on Jan. 5, 1990 in behalf of Pini, et al. In this Application, a method is described whereby the portable radiotelephone's display processor may be used to process the cellular system query thereby avoiding adding hardware to the portable radiotelephone. This is especially important in portable radiotelephone applications where space constraints are rigorous.

However, when a CVC or some other peripheral is to be integrated with a portable radiotelephone on a common data bus as described in U.S. patent application Ser. No. 303214, that data bus cannot guarantee an adequate response to the cellular system queries due to delays caused by inherent data bus characteristics such as the amount of data transfer required to integrate radiotelephone functions over the data bus, the control of the data bus by the contending data transmission systems, and the method of queuing messages into the data bus.

Therefore, it would be desirable to provide a fast data bus that avoids these problems so that subscriber equipment that integrates a portable with a CVC or some other peripheral, is able to respond to these cellular system queries. It would also be desirable to use the microprocessors in the portable radiotelephone to process the system queries in manner similar to that described in the aforementioned U.S. patent application Ser. No. 461,570 because in many applications, particularly portable radiotelephones, the number of bus lines and corresponding connectors and compatibility with existing systems are important considerations. It would also be desirable to retain the same number of signal lines in a combined faster asynchronous/synchronous data bus structure, as well as to retain hardware compatibility with mobile and portable units presently in use.

SUMMARY OF THE INVENTION

A data transfer apparatus employing a data bus having a synchronous mode and an asynchronous mode for communication between a first memory unit and a second memory unit determines a need for memory transfer and responsively searches a plurality of memory segments in the second memory unit for a valid data record stored in one of the memory segments. The memory transfer device then communicates the valid data record from the second data unit to the first memory unit in the asynchronous mode when the search finds a valid data record and communicates an empty data record from the second data unit to the first memory unit in the asynchronous mode when the search does not find a valid data record.

DETAILED DESCRIPTION OF THE PREFERRED EMBODIMENT

The present invention can be used to transfer data between a portable radiotelephone and a CVC unit, enabling a radiotelephone user to take advantage of the best characteristics of both portable and mobile type radiotelephone equipment. Although the present invention describes the use of a portable radiotelephone with a CVC, the invention may just as well be used in other applications that require a portable radiotelephone to transfer data to an external device.

The present invention has been designed to operate in the portable radiotelephone units of a cellular system, although it could be used in any automatic radiotelephone system. The portable unit may be one such as that marketed by Motorola, Inc, as sales model F09FGD8453AA or generally of the type described in U.S. Pat. No. 3,906,166 "Radio Telephone System" by Cooper et al. and U.S. Pat. No. 3,962,553 "Portable Telephone System Having a Battery Saver Feature" by Linder et al.

In order to accommodate the signalling and control functions in an automatic radiotelephone system, a microprocessor, memory, and related peripheral devices are employed in a logic unit for control of a portable radiotelephone unit. This logic unit may be architectured such that the signalling received from the base station or transmitted to the base station is handled on a high speed interrupt basis while control signals for the radio unit, including keyboard and display, are handled on a lower speed basis by way of a separate serial data bus.

Figure 1:
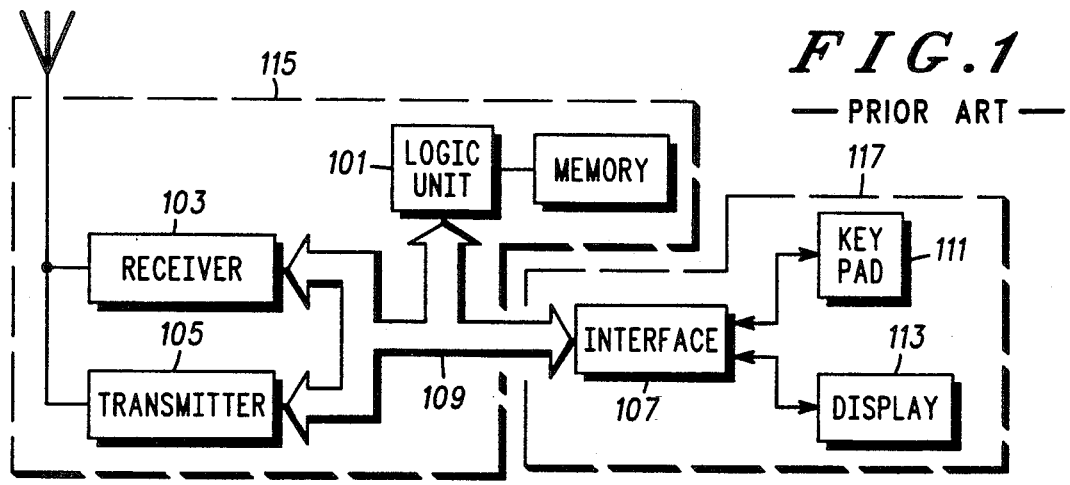
FIG. 1 is a block diagram of a conventional portable radiotelephone which may employ the present invention.

Alternately, all data communication between the logic unit, the portable transceiver and the integral keypad and display may be handled on a high speed data bus as shown in FIG. 1. In FIG. 1, a conventional logic unit 101 is connected to a receiver 103 and a transmitter 105 and an interface 107 and may use self-clocking serial data bus 109. The receiver 103, transmitter 105, and logic unit 101 with its associated memory may be physically grouped together as a radio unit 115. The interface 107 and telephone keypad 111 and user character display 113 may be a separate control unit 117 (as in a mobile radiotelephone configuration) or it may be fully integrated with the radio unit into one package (as in a portable radiotelephone). The self-clocking nature of the serial data bus 109 enables the interface adaptor 107 to be remotely located from the logic unit 101.

Figure 2:
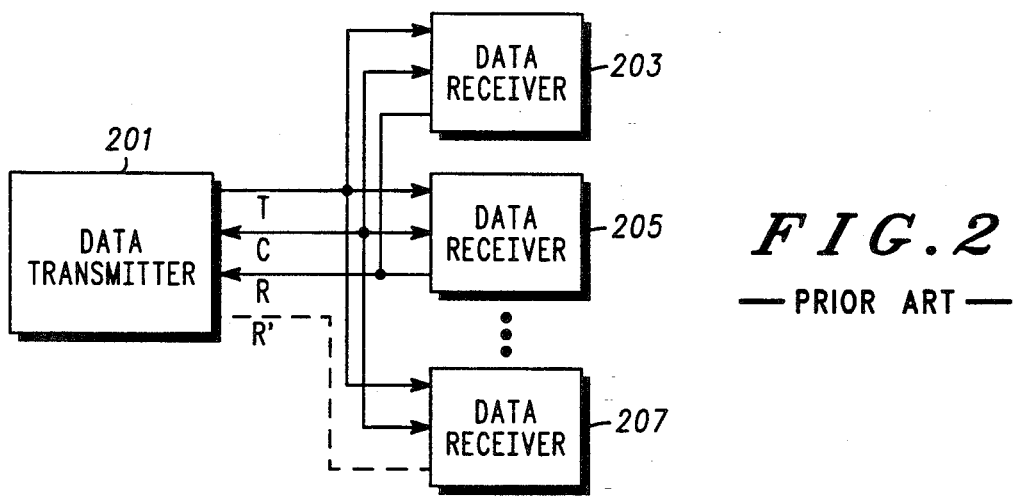
FIG. 2 is a block diagram of a known generalized data communication system which may be useful in employing the present invention.

The serial data bus, as depicted in FIG. 2, has been described in U.S. Pat. No. 4,369,516 and in U.S. patent application Ser. No. 303,214 "Multiplexed Synchronous/Asynchronous Data Bus" filed on Jan. 27, 1989 in behalf of Wilson, et al. A general data transmitter 201 is coupled to data receivers 203, 205, and 207 by two signal lines, labeled T (true data) and C (compliment data). The data receivers 203 and 205 may also transmit return data signals to the data transmitter by means of a shared signal line labeled R (return data). A separate return line (R') may also be used to transmit return data signals to the data transmitter as shown for data receiver 207. The return data signals transmitted by the data receivers 203, 205, and 207 on the return data signal lines are transmitted in synchronism with the data signals received from the data transmitter 201 on on the true data and complement data signal lines.

Figure 3:
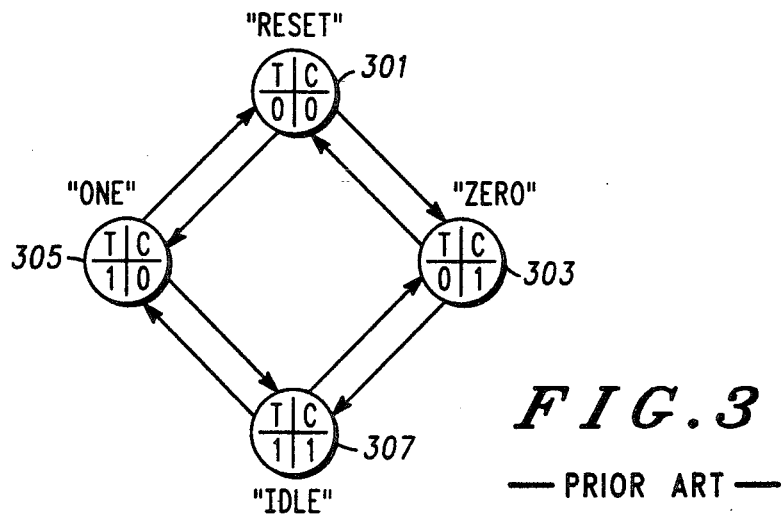
FIG. 3 is a state diagram for a known method of communicating data on the system of FIG. 2.

If the general bidirectional bus concept of FIG. 2 is applied to the control circuitry of a portable radiotelephone, the data transmitter becomes the logic unit and the data receivers become the transmitter, receiver, user interface, and other devices sharing the bus. The format taken by the data transmitted from the data transmitter 201 to the data receivers 203, 205, and 207 makes use of the four two-bit binary states which can be assumed by the true data and complement data signal lines taken together. For example, referring to the state diagram of FIG. 3, a first two-bit binary state may be referred to as a "reset" state 301, where the true data signal line has a binary zero value and the complement data signal line also has a binary zero value. When no data is being transmitted, the reset state 301 is provided on the true data and complement data signal lines. When a data signal is to be transmitted, a transition is made from the reset state 301 to either a "zero" state 303 or a "one" state 305 corresponding to a zero or a one in the input data to be transmitted. In the zero state 303, the true data line assumes a binary zero value and the complement data line assumes a binary one value and the complement data line assumes a binary zero value. Following the one state 305 or the zero state 303, the serial data bus assumes an "idle" state 307 in which both the true data line and the complement data line assume a binary one value. A transition is then made from the idle state to either the one state 305 or the zero state 303. For all succeeding bits of the data signal to be transmitted, a transition is made to the idle state 307 before a transition to the one state 305 or the zero state 303. This can be seen in FIG. 4.

Figure 4:
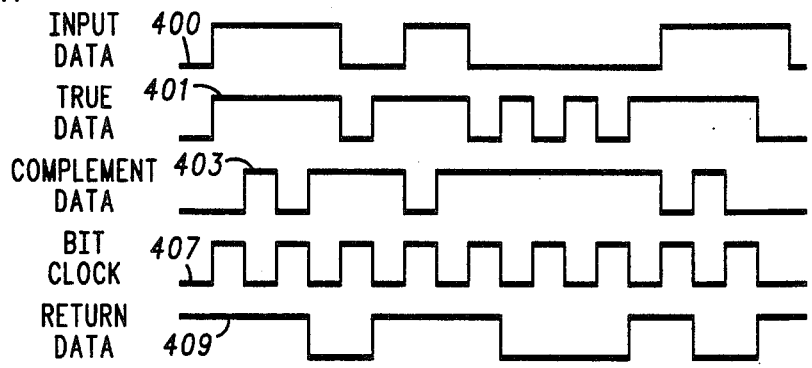
FIG. 4. is a timing diagram showing the relationship between the input data and the data transmitted over the system of FIG. 2.

Transitions between the states in FIG. 4 are selected such that only one signal line is changing binary value during each transition. Transitions between the reset state 301 and the idle state 307 and between the one state and the zero state 303 are not allowed since they would require that the value of both the true and the complement data signal lines change simultaneously. This limiting of transitions between the binary states minimizes the effects of skewing and timing variations. Moreover, by transmitting data signals as illustrated in the state diagram of FIG. 3, the transmission on the true data and complement data signal lines is both selfclocking and independent of the transmitting frequency. The time duration between each of the state transitions need not be the same and may vary dynamically thereby enabling the frequency of the data transmission to be entirely asynchronous with randomly varying time intervals between successive state transitions.

Understanding of the synchronous data format may be enhanced by referring to FIG. 4. For transmissions of a data signal, two state transitions occur for each input data bit shown in input data stream 400. For the first bit of the transmitted data signal, a transition is made from the reset state 301 to the one state 305 resulting in the true data signal line attaining a binary one as shown at 401. Next, a state transition is made to the idle state 307 resulting in the complement data signal line attaining a binary one value at 403. Then, for each succeeding bit of the data signal, a transition is made to the one state 305 or the zero state 303 and then back to the idle state 307 for each bit of the data input signal to be transmitted, the received idle state 307 can be utilized at the data receivers to generate a bit clock signal 407. For the last bit of the data signal, the last state transition is made from the one state 305 or the zero state 303 to the reset state 301. Returning to the reset state 301 after the last bit of the data signal has been transmitted indicates to the data receivers 203, 205, and 207 that a complete data signal has been transmitted.

Figure 5:
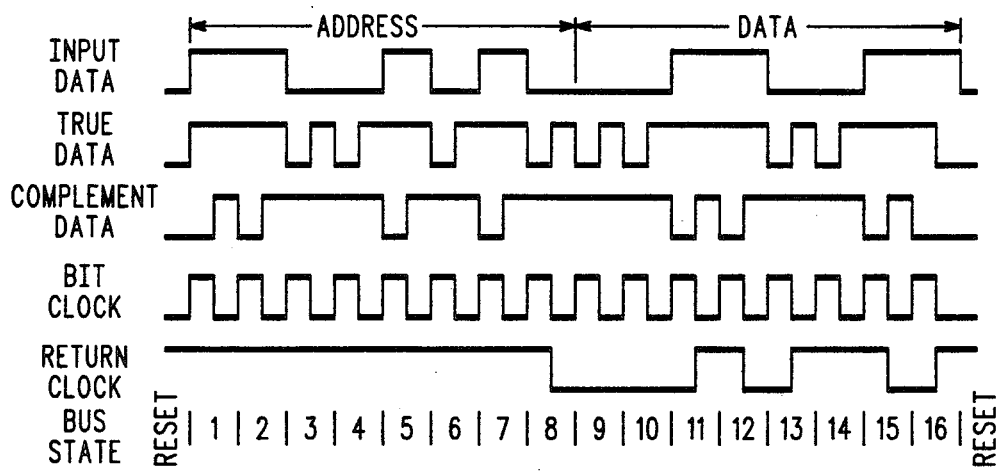
FIG. 5 is a timing diagram showing the information and addressing data which may be transmitted over the system of FIG. 2 and may be used to select a particular data receiver for the information.

In order to provide for the bidirectional transmission of data signals between the the data transmitter 201 and the data receivers 203, 205, and 207, another signal referred to as the return data signal 409 is provided for carrying data signals from the data receivers 203, 205, and 207. The data receivers can transmit a return data signal on the return data signal line by utilizing the bit clock signal 407 developed by detecting the bit value of the true data and complement data signal lines. As previously described, separate return data signal lines can be provided to each data receiver as for data receiver 207, or a number of data receivers such as data receivers 203 and 205 can be connected to one return data signal line. If a number of data receivers are connected to the same return data signal line, it becomes necessary to selectively address the particular data receiver that is to transmit a return data signal. Many different addressing schemes may be utilized and one such addressing scheme, which utilizes a portion of the data signal transmitted by the data transmitter to provide an address, is shown in FIG. 5.

The number of bits dedicated to the address function determines the maximum number of data receivers which can be uniquely addressed. It has been shown in U.S. Pat. No. 4,390,963, that the true data and complement data signal lines may be dynamically interchanged and an additional number of unique addresses may be obtained.

A serial asynchronous bus which may be utilized in the present invention is that which may be employed as the Serial Communication Interface (SCI) for the MC68HC11 family of 8-bit microprocessors (or their equivalents). Such an asynchronous bus is characterized by a standard NRZ format (one start bit, eight or nine data bits, and one stop bit) and meets the following criteria:

1) The idle line is brought to a logic one state prior to transmission/reception of a character.

2) A start bit (logic zero) is used to indicate the start of a frame.

3) The data is transmitted and received least-significant-bit first.

4) A stop bit (logic one) is used to indicate the end of a frame. A frame consists of a start bit, a character of eight or nine data bits, and a stop bit.

5) A break is defined as the transmission or reception of a low (logic zero) for at least one complete frame time.

As in the previously disclosed U.S. patent application Ser. No. 303,214, the faster single line asynchronous SCI bus is layered over the top of the synchronous bus. This enables backwards compatibility with equipment which may utilize only the synchronous bus while increasing the rate of data transfer.

Figure 6:
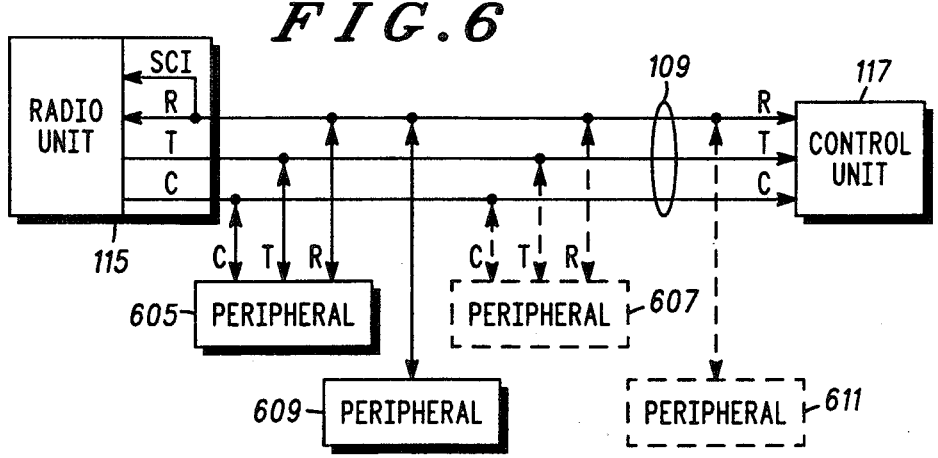
FIG. 6 is a simplified block diagram of a radiotelephone remote unit having a three wire bus structure with multiplexing capability.

In a portable radiotelephone with integral radio unit and control unit (generically called a remote unit), the T (true data) and C (complement data) lines are unidirectional lines that go between the logic unit 101 of the radio unit 115 and the interface of the control unit 117 and from the radio unit 115 to external or other internal peripherals. The third line is the bidirectional R (return) line 209, and is used by the control unit 117 and peripherals to talk to the radio unit 115, the logic unit 101, and other devices on the bus. Data is passed down the bus, with T and C setting up the timing. It is a sychronous bus. In the preferred embodiment, a high speed asynchronous bidirectional bus is multiplexed on the R (return line) of the synchronous self-clocking data bus (called herein a three-wire bus or TWB). The high speed asynchronous bus (SCI) runs at over 10 times the speed of the TWB and, through software control, can share the same data line. The SCI employed in the present invention is a single line bidirectional bus. All devices that communicate on this bus write to the same line as well as receive data from it. FIG. 6 shows a generalized configuration of the two multiplexed buses.

As shown, the TWB of T, C, and R lines are coupled from the radio unit 115 to the control unit 117. In a portable radiotelephone unit, the radio unit 115 and the control unit 117 are physically located in the same housing. Peripheral 605 which is also coupled to the T, C, and R lines can receive data from the TWB as well as send data to other peripherals 607 (if any), as well as the remote unit 601 and the control unit 603. Such peripherals may be CVCs, scramblers, data devices, or additional handsets and may be internal or external to the portable radiotelephone remote unit. An example of a CVC peripheral is described in U.S. Pat. No. 4,680,787 which is a vehicle-mounted converter which can provide external power, an external antenna, radio-frequency (RF) amplification for the receiver and/or transmitter of a portable radiotelephone, and other features which may not be available on the portable radiotelephone. In the generalized bus structure of FIG. 6, the CVC peripheral may be represented by peripheral 605.

Figure 7:
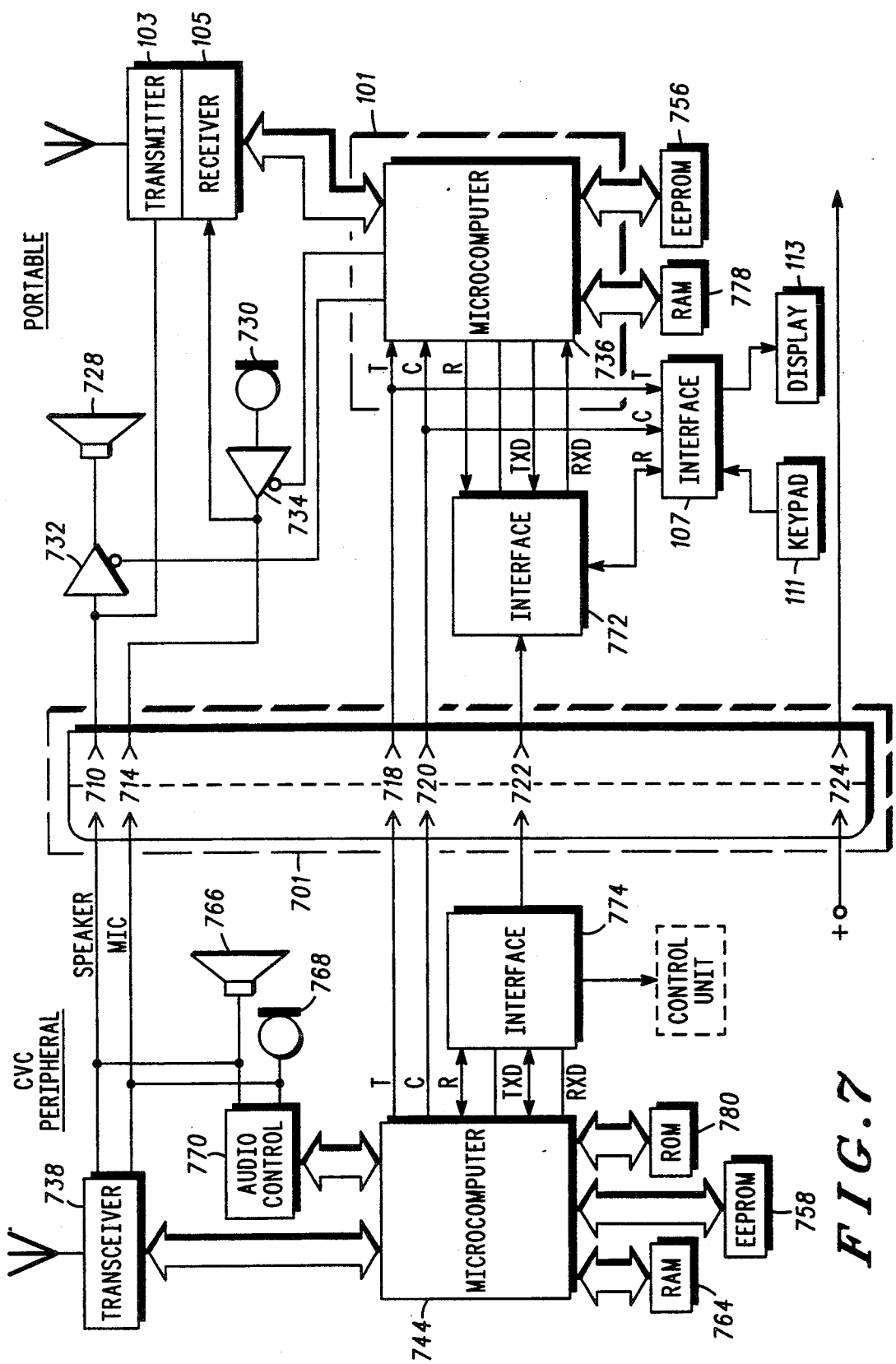
FIG. 7 is a block diagram of a portable radiotelephone remote unit and a CVC converter peripheral which may employ the present invention.

In a system employing the present invention, when the portable radiotelephone is connected to the CVC peripheral 605, an automatic integration of all logic functions occurs upon power-up after the CVC and portable radiotelephone have been connected together to form a single subscriber unit. Such a configuration is shown in FIG. 7.

On power-up, bus control is assumed by the CVC. In the preferred embodiment, it verifies that other devices on the bus are hardware and software compatible. If the devices are not compatible, the CVC will power down. A security data slot may also be provided whereby the device in control of the bus can send out encoded data to "slaves" (other devices), which must then decode the data and send back an appropriate response. This security system can be used to prevent access to the cellular system by unauthorized users using peripheral-like devices. Once the compatibility check is accomplished, functions, options, and information set which originally were part of the portable radiotelephone may be transferred to the CVC peripheral 605.

Previously, this transfer was done over the TWB. However, it was found that transfer over the TWB required too much time. This was evidenced by a noticeable delay between the time the user powered on the radiotelephone equipment, and the time when the radiotelephone equipment was ready for user operation. In cellular radiotelephone systems, each individual subscriber radiotelephone, portable or mobile, has one or more unique associated information sets, one of which includes Number Assignment Module (NAM) data (e.g., phone number, system ID, system channel scan data and serial number) another being repertory data, which contains user accessible information (e.g., phone number directories that can be updated by the user). The phone number in the NAM data is used by the cellular radiotelephone systems to identify the subscriber radiotelephone equipment using the system. The repertory data is necessary for other user accessible functions. It is likely that a radiotelephone system user may have a portable radiotelephone and a CVC peripheral, therefore, it is economically (and, in some instances, necessary to comply with regulatory requirements) advantageous to have the CVC peripheral contain all of the functions and options specific to a particular portable radiotelephone and to be endowed with the capability of assuming the identity of the portable radiotelephone as defined in the aforementioned NAM data. Such a transfer of identify enables the CVC (with the portable radiotelephone coupled to or plugged into it) to respond in a timely manner to queries from fixed equipment. Processes for transferring identity data are described in U.S. patent application Ser. No. 107,227 "Radio Arrangement Having Two Radios Sharing Circuitry" filed on Oct. 9, 1987 in behalf of Metroka and aforementioned U.S. patent application Ser. No. 303,214.

NAM and Repertory data transfer communications between the CVC peripheral and the portable radiotelephone include data transfer between the microprocessors resident in the CVC peripheral and the portable radiotelephone logic unit.

The portable radiotelephone must download its NAM, serial number, and telephone number repertory memory into the CVC peripheral in order for the portable radiotelephone-CVC combination to work without annoying delays to the user and to minimize on-going communications between the portable radiotelephone and CVC peripheral. All functionality of the subscriber portable radiotelephone is transferred to the CVC peripheral to minimize potential on-going communication between the CVC peripheral and the portable radiotelephone. Thus, when the portable radiotelephone's hardware is used to process a system query, the multiplexed communication bus will not have an excessive number of queued messages that might otherwise prevent compliance with the regulatory time specification for answering these queries.

Referring now to FIG. 7, a portable radiotelephone is shown in a detailed block diagram coupled to a CVC peripheral by way of a three wire bus to convey data between the portable radiotelephone and the CVC peripheral. As described previously, a portable radiotelephone user may insert a portable radiotelephone into a vehicular-mounted converter (CVC) for external power, external antenna, RF amplification, and other features. A connector interface 701 is illustrated in FIG. 7 which connects audio signals via connections 710 and 714, TWB lines via connections 718, 720, and 722, and power via connection 724. Other connections, of course, may be made as necessary.

Connections 710 and 714 are connections of audio signals derived from a receiver of transceiver 738 or produced by microphone 730 and coupled to a transmitter of the transceiver 738, which allow the portable to act as a handset, while the portable and CVC peripheral are intercoupled. A speaker 728 and a microphone 730, conventional in portables, are coupled to the audio connections 710 and 714 through mute gates 732 and 734 to provide this function. The mute gates may be controlled by microcomputers 736 and 107 as is conventionally provided in stand alone portables or mobiles. See, for example, Motorola Instruction Manual Nos. 68P81070E40 and 68P81046E60, entitled "DYNA TAC Cellular Mobile Telephone Instruction Manual" and "DYNA TAC Cellular Portable Telephone Instruction Manual" respectively. Both manuals are available from Motorola C & E Parts, 1313 Algonquin Road, Schaumburg, IL, 60196, U.S.A. Microcomputers 736 and 744 may be conventional microprocessors such as MC68HC11A8 or equivalent devices.

The CVC peripheral of the preferred embodiment may contain a complete radio transceiver 738, as described in aforementioned U.S. patent applications Ser. Nos. 107,227 and 303,214, in which case the portable radiotelephone transmitter 103 and receiver 105 are deactivated and, the logic unit 101 performs only limited functions so that the portable radiotelephone becomes what is commonly referred to as a "dumb handset." This deactivation continues during the time the portable is coupled to the CVC peripheral. The CVC peripheral, in effect, takes on the identity and all functionality of the portable radiotelephone during the period of coupling and is operated by the user as though it were a conventional mobile radiotelephone with the portable radiotelephone acting as simply the handset to the coupled unit if no external handset is available. If any dynamic updating is necessary, such as new phone numbers to be added to repertory data, the updating is done first to the CVC peripheral's RAM 764 and then the CVC peripheral updates the portable radiotelephone's memory by sending SCI messages to the portable radiotelephone microcomputer while the units are coupled.

Upon the portable radiotelephone CVC combination being powered by, an exchange of data occurs on the multiplexed synchronous/asynchronous data bus of the present invention whereby the NAM information stored in the portable memory EEPROM 756 is downloaded via microcomputer 744 and microcomputer 736 into RAM 764. Such a data transfer allows the CVC peripheral to assume the portable's identity for subsequent communication on the cellular system. All other portable functions, such as repertory dialing telephone numbers, are also downloaded into the CVC peripheral's static RAM 764. Likewise, control of audio transducers 728 and 730 may be relinquished to microcomputer 744 and audio control 770. This transfer occurs each time the coupled CVC peripheral portable system is powered up.

The amount of data to be exchanged is, therefore, a sizable amount and would generally require a relatively long time to transfer at the 500 bps rate of the conventional TWB. The multiplexing of the present invention allows a much higher rate of data transfer by placing the TWB in an in-use state (thereby preventing the interface of the portable radiotelephone, for example, from accessing and applying data to the TWB) and transferring the identifying data from the portable radiotelephone on the serial data bus of the R line. In the preferred embodiment, the SCI bus has priority on the multiplexed bus so that SCI messages do not have to wait multiple TWB cycles for the TWB to relinquish control before SCI data can be transferred. Additionally, the present invention uses a selective search routine to transfer repertory data in a manner that does not cause an annoying delay to the user between the time he initiates a power-up and the time when the radiotelephone is ready for use.

Figure 8:
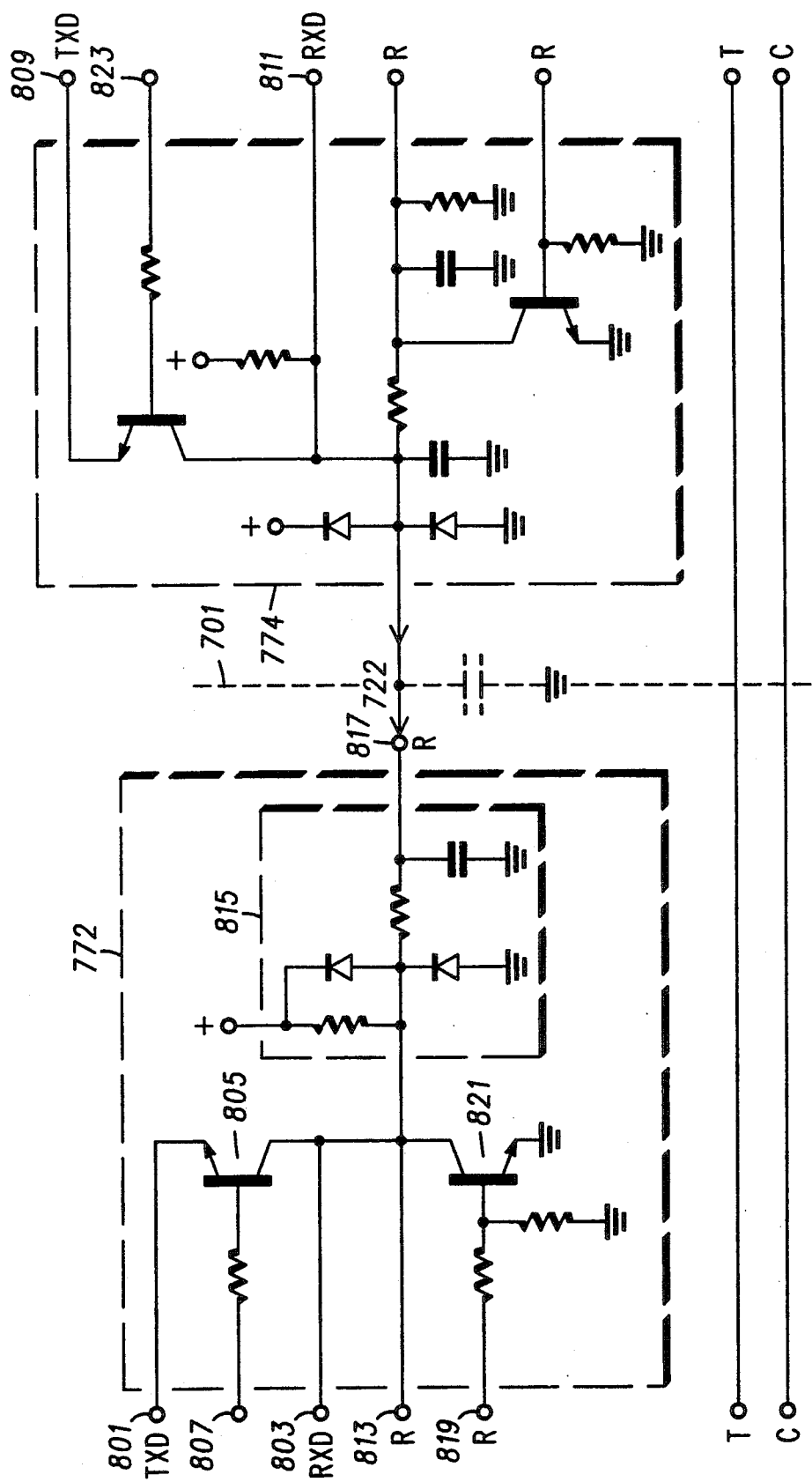
FIG. 8 is a schematic diagram of the R line interfaces of FIG. 7.

An interface 772 is resident in the portable radiotelephone and an interface 774 is resident in the CVC peripheral. A more detailed schematic of interfaces 772 and 774 is shown in FIG. 8. TXD input 801 and RXD output 803 are coupled respectively, to the appropriate ports of microcomputer 736 (not shown in FIG. 8). Separation between ports TXD 801 and RXD 803 may be realized by transistor 805 under control of one input 807 connected to the microcomputer 736 (but is not used in the preferred embodiment). Likewise TXD input 809 and RXD output 811 and control port 813 of interface 774 are coupled to the CVC (Converter) peripheral microcomputer 744.

The R line is coupled from microcomputer 736 to input 813 of interface 772, through coupling network 815, and output via output 817. The R line from control unit interface 107 is coupled via port 819 and transistor 821 to the coupling network 815. A similar arrangement is made for interface 774.

Figure 9:
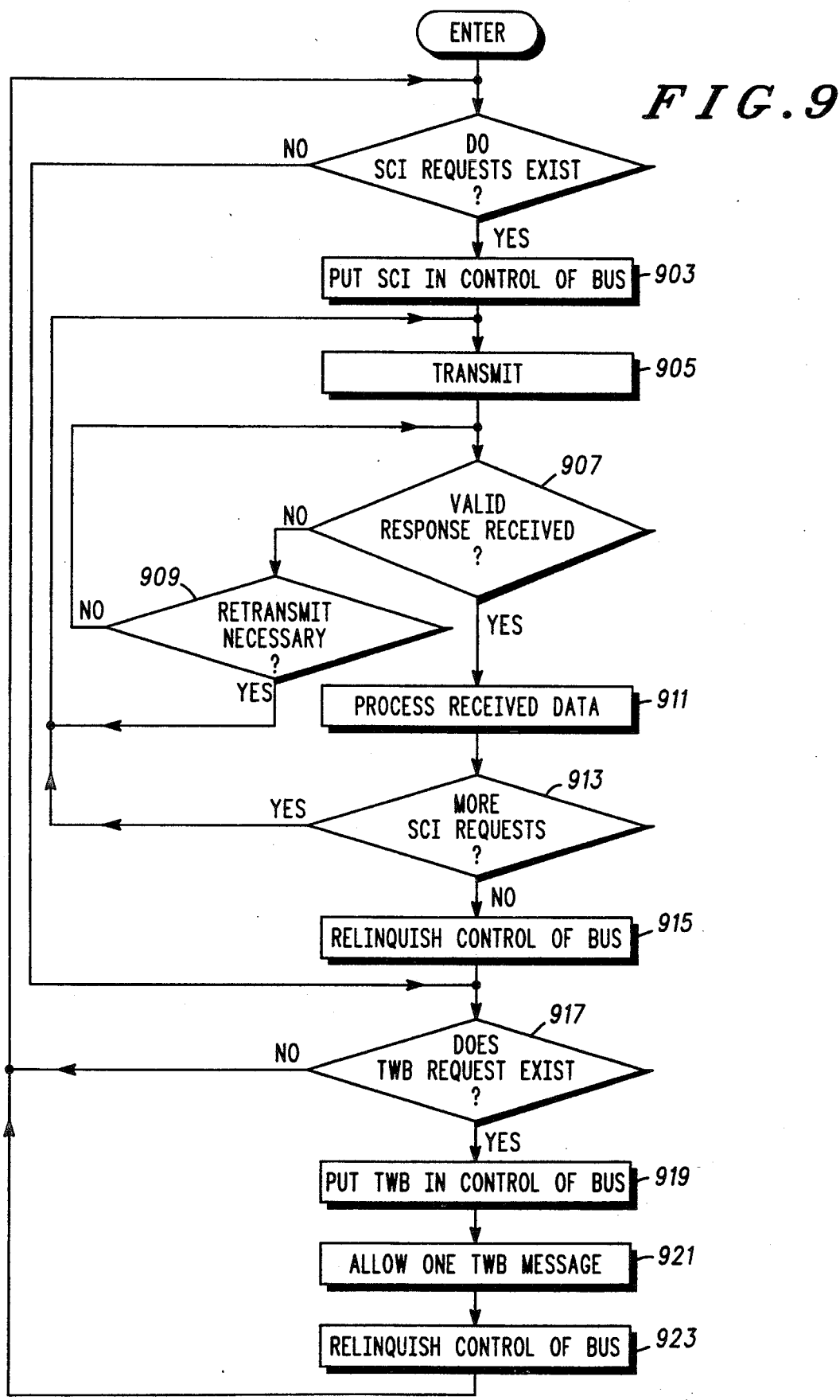
FIG. 9 is a flowchart of the bus master allocating control of the multiplexed bus to either the synchronous or asynchronous data buses.

The method exercised by microcomputer 744 (as stored in memory ROM 778) to control the multiplexed synchronous/asynchronous data bus of the preferred embodiment is shown in the flow chart of FIG. 9. As originally disclosed in aforementioned U.S. patent application Ser. No. 303,214, the master gives control back to the TWB protocol after each SCI message attempt. Under certain circumstances, such as a system query which might be generated at the fixed site of a digital cellular system, the nature of the data contained in these SCI messages requires that messages be processed as quickly as possible. previously, transmission of any additional messages requests would be delayed until the next time the SCI bus was in control (i.e. potentially after one or more TWB cycles), rather than being processed right away. This processing delay also occurs when it is necessary to retransmit a message due to a received message containing errors or a required message response timing out. In the preferred embodiment and under most operating conditions the SCI is in control of the multiplexed bus. When the slower TWB protocol is allowed access to the multiplexed bus lines, it is allowed access for only one TWB protocol message cycle at a time and it must relinquish control after the message cycle. When the TWB protocol has control, messages are processed as previously described on the T, C, and R lines. When the portable radiotelephone is connected to the CVC, an exchange of a substantial amount of data must occur in order to transfer the portable radiotelephone functions to the CVC peripheral. The portable detects a change in power source and processes an initial power-up sequence when the user turns on the coupled portable-CVC unit.

On power-up, bus control of the multiplexed TWB bus is assumed by the CVC, employing the SCI protocol. In the preferred embodiment, after the CVC peripheral has assumed control of the bus (it is the bus master), it verifies that other devices on the bus are hardware and software compatible by polling other devices on the SCI bus via the R line at 901. If the devices are not compatible the coupled CVC portable unit will power down.

On power-up, SCI messages are sent by first setting the input port 823 of CVC side interface 774 to a logic high in order to couple the TXD and RXD line of the microcomputer 744 together. Control of the multiplexed bus is then obtained by placing a logic high on the C line at 903 of the control process of FIG. 9. This is the default state of the multiplexed bus in the preferred embodiment. The process then waits for a period of time greater than one normal TWB data bit before commencing the transmission of a polling message or a data message at 905. Once the SCI protocol data bus takes control of the multiplexed bus at 903, it will remain in control until all SCI requests in the master (normally the CVC) and slave devices (normally the portable) have been processed. SCI requests of the slave device, here normally the portable radiotelephone, have precedence over message transmittals by the master (see FIG. 10 and 11).

A response is expected to the transmitted polling message or data message and a test is performed, at 907, for this response. Any retransmissions necessary due to error conditions are determined, at 909, and will be serviced before control of the multiplexed bus is relinquished to the TWB. If a valid response has been received, at 907, the response is processed, at 911, before a test is made, at 913, to determine if more SCI requests need to be processed. After all SCI messages have been processed the SCI protocol relinquishes control of the bus, at 915, and the TWB will be allowed to take control of the multiplexed bus for one message cycle, after which it must relinquish control back to the SCI bus on the multiplexed bus. A placement of a logic low on the C line puts the TWB in control of the multiplexed bus.

If a request for a message transmission in the TWB format is pending, a determination of such a pending request is made at 917. A pending request puts the TWB protocol in control of the bus, at 919, and only one message is allowed to be transmitted, at 921, before the TWB protocol relinquishes control of the bus, at 923. The response time of the previous shared TWB/SCI protocol bus is slowed for at least the following three reasons: A) The previous implementation is capable of doing only one slave initiated request at a time. After each slave request, the slave is delayed because it must send a poll acknowledge and then wait for the master to send another poll before it can send its next slave request. B) The master puts the poll message in its queue rather than transmitting it out right away. This can result in service to the slave being delayed because the extra time required to queue and eventually transmit the poll, as well as the delay required to process any master requests already in the master's queue. One additional delay occurs during multiple slave requests. Since the slave sets a bit in its message indicating additional data whenever there is something in its queue, the master will try to queue a poll when it receives the slave request and when it receives the poll acknowledge. Thus, additional processing time previously was required to examine the queue to prevent multiple poll messages from being in the queue at the same time. C) If there is a transmission error in the poll from the master or in the poll acknowledge from the slave, the previous implementation can execute the wrong servicing module and could potentially cause the radio to lock up.

To increase the response time, a master employing the present invention sends normal messages and maintenance polls. The master will GRANT service to the slave whenever sending polls or whenever the slave is requesting service. If the master sees a request bit set by the slave, the master will preempt the master's queue and send a poll to the slave immediately. After the initial poll, it will continue granting service to the slave (in the response to each slave request which would be the case for peripherals having multiple requests) until it receives the acknowledge to the poll it sent previously. If the poll acknowledge received has the request bit clear, then the slave request mode (of FIG. 12) is terminated and the master can proceed with the requests in its own queue. If the request bit is still set, the master would initiate slave request mode again by sending a new poll to the slave device.

Figure 10:
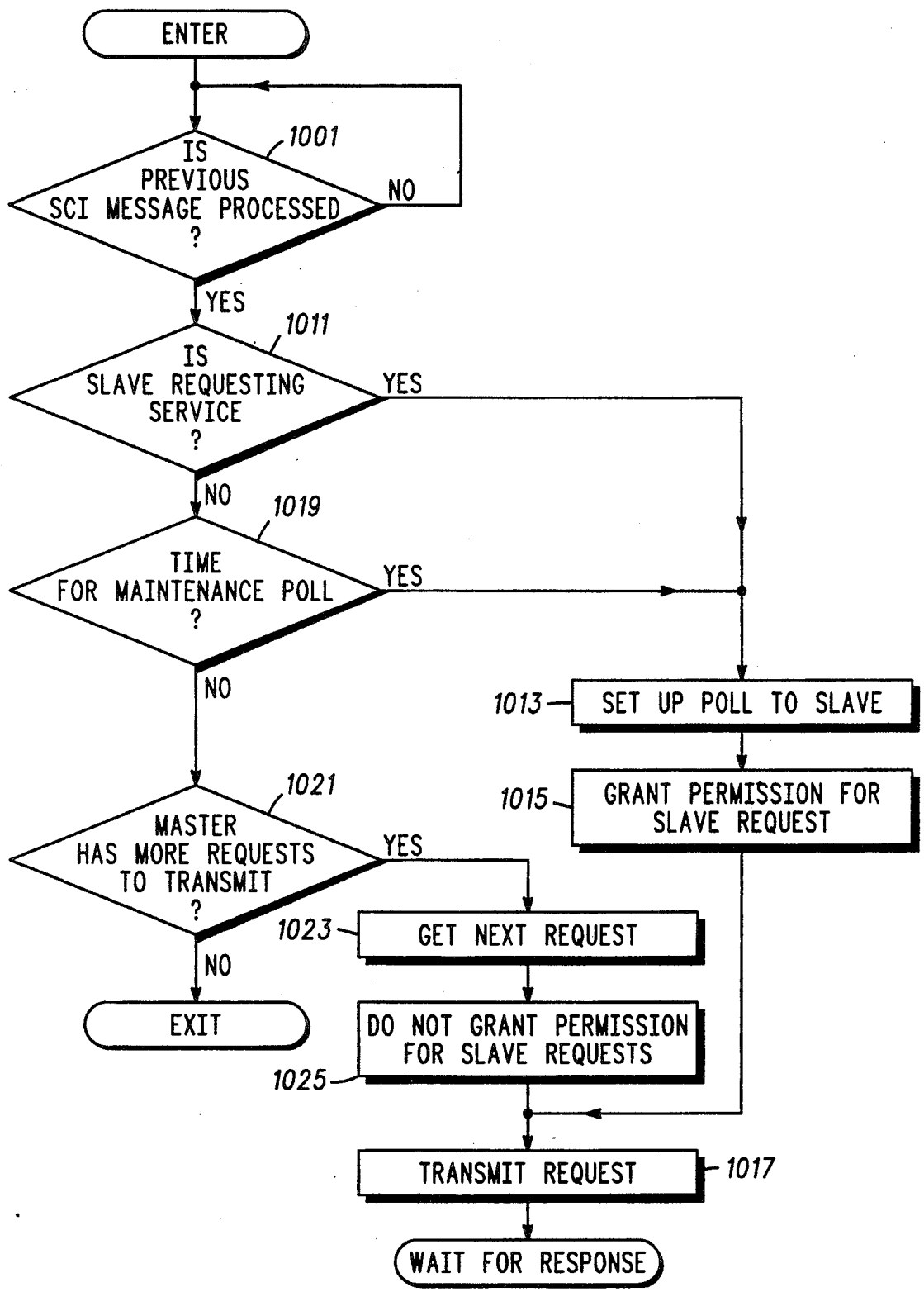
FIG. 10 is a flowchart of the process the bus master uses when transmitting messages to slave devices using the SCI protocol data bus.

Referring now to FIG. 10, during normal operation the master will send out normal messages and routine maintenance messages from a queue of message to be sent. The master grants service to the slave whenever it sends out a poll to the slave or the slave is requesting service by setting a SLAV-REQ bit in its (master's) message preamble. A test is made, at 1001, to determine if a previous SCI message is processed. If yes, a determination is made, at 1011, if a slave peripheral is requesting service. A positive response sets up a poll to the slave peripheral, at 1013, and a grant of permission, at 1015, for the slave to transmit its message, before transmitting, at 1017.

If a slave peripheral is not requesting service, as determined at 1011, a determination is made, at 1019, if the time has come for a maintenance poll to be made. A positive determination results in a set up to poll slave, at 1013, and the sequence of steps to transmit, as described previously. If the time has not yet come, a test is made, at 1021, whether the master has more requests to transmit. No additional requests results in an exit of the process while a finding of more requests causes the process to get the next request, at 1023, set up a denial of slave requests, at 1023, and a transmission at 1017.

Figure 11:
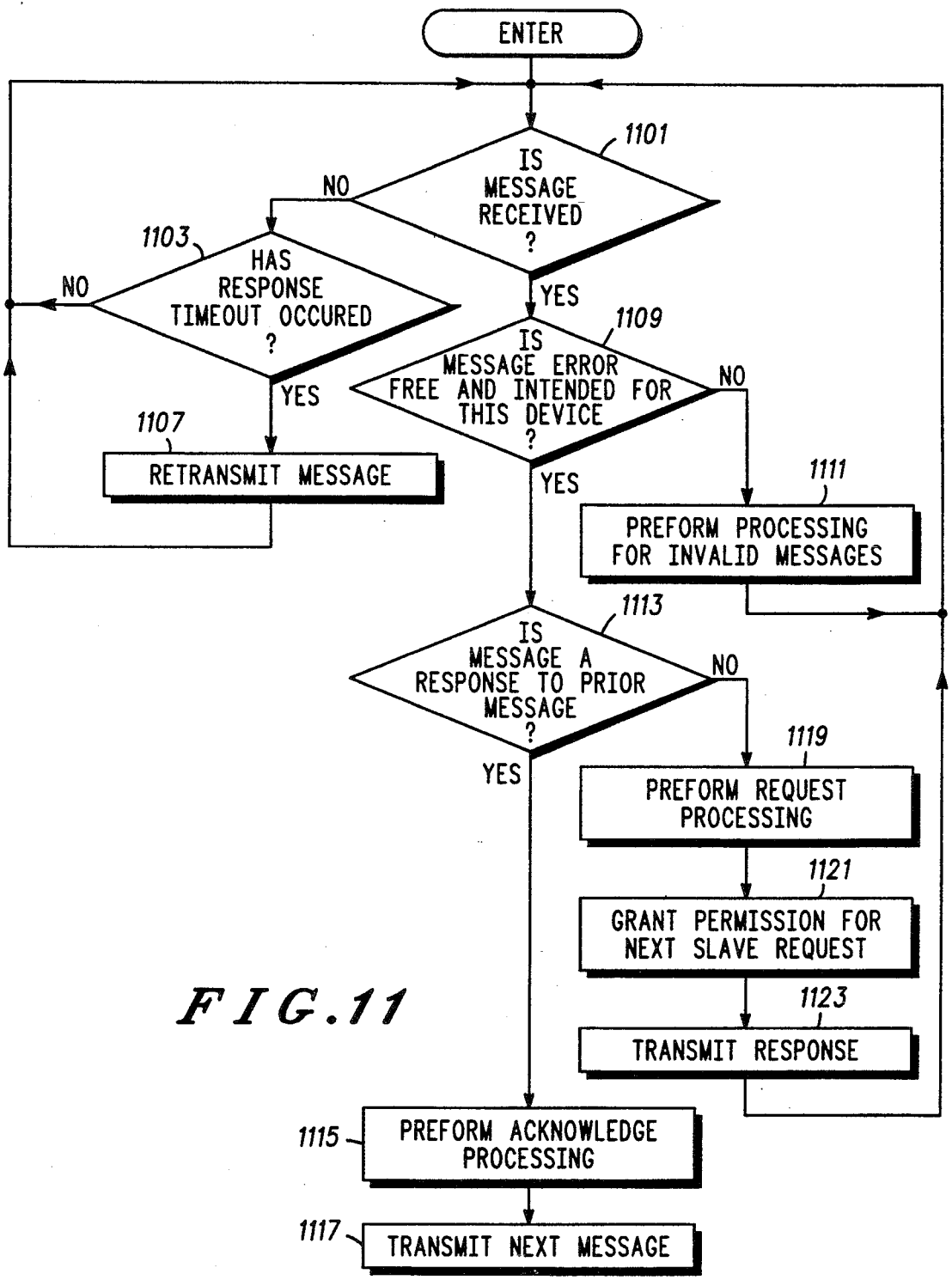
FIG. 11 is a flowchart of the process the bus master uses when it receives messages from the slave devices using the SCI protocol data bus.

The process employed by the master in the preferred embodiment to receive messages from a slave peripheral is shown in the flowchart of FIG. 11. A determination of message status is made, at 1101, and if no message of a response has been received within the time allowed for a response (as determined at 1103), the master's message is retransmitted, at 1107. If a message has been received, the message is studied at 1109, for an error free condition and proper addressing to the master. Detection of errors or improper address results in the execution of a process, at 1111, to perform processing for invalid messages. Proper addressing and an error-free condition results in a test of whether the current message is a response to a prior message of the master's, at 1113, and if so, acknowledgement processing is performed, at 1115, before transmitting the next message, at 1117. If the current message is not a response, request processing is performed, at 1119, before permission for the next slave request is granted, at 1121, and transmitted, at 1123.

Figure 12:
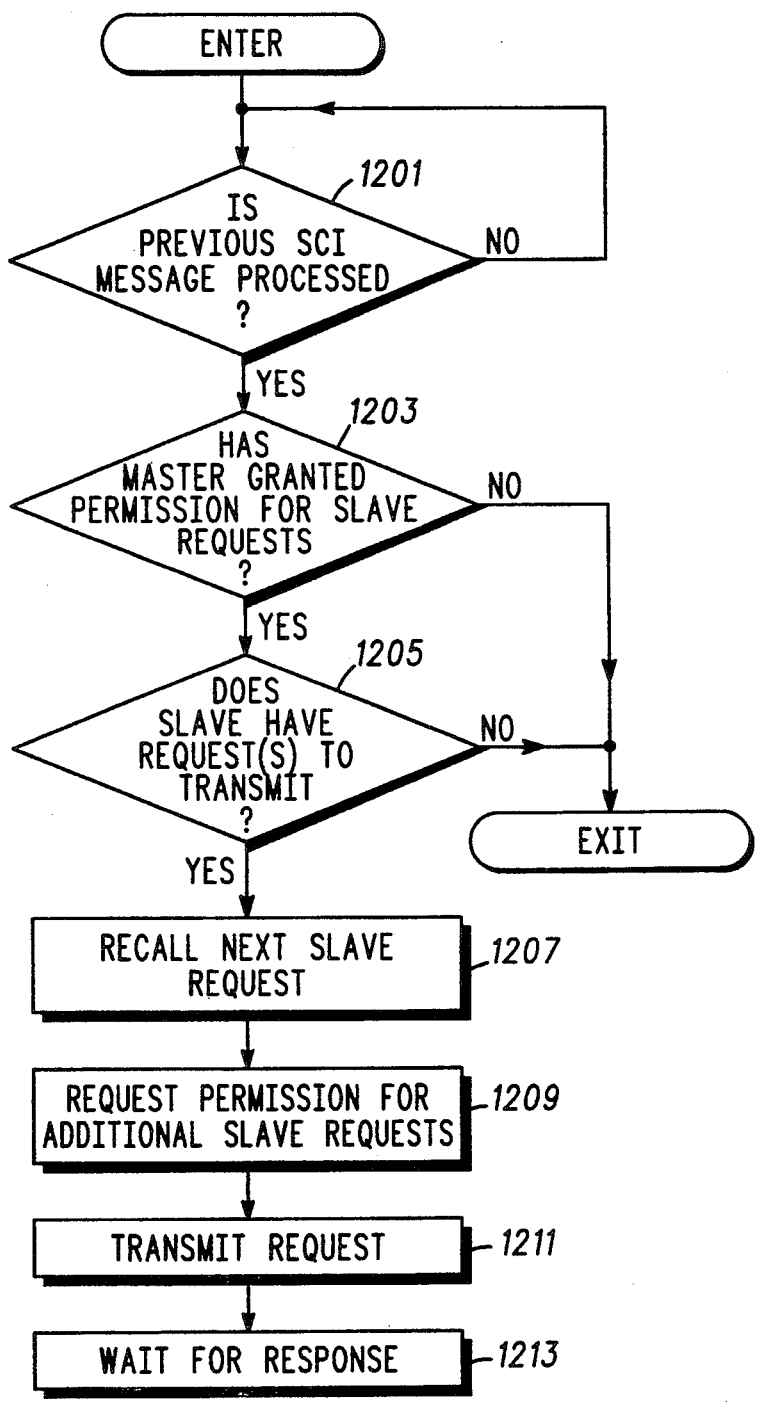
FIG. 12 is a flowchart of the process used by a slave device using the SCI protocol data bus to queue and transmit its messages.

The slave requests service, i.e., tells the master it has messages in its queue, by setting its SLAV-REQ bit and queueing and transmitting its request message in accordance with the process shown in the flowchart of FIG. 12. As long as the slave requesting service has more messages in its queue, the master's own queue is preempted as shown at 1011 in FIG. 10, and the master continues granting service to the slave until the slave sends an acknowledgement to the master indicating that it does not have any more requests left in its message queue. The slave peripheral determines, at 1201, that the previous SCI message has been processed and determines, at 1203, that the master has granted permission for slave requests. If the slave peripheral has the approval, it determines, at 1205, that it has one or more requests to transmit. If a request to transmit is present, it is recalled, at 1207, permission is requested for additional slave requests, at 1209, and the request is transmitted, at 1211. A response from the master is then awaited, at 1213. Therefore, in the preferred embodiment, when the slave's (portable radiotelephone) display processor is done processing a system challenge the slave is able to send the appropriate response via the SCI bus to the CVC peripheral and then to the cellular system equipment without any queueing delays. This lack of queueing delay is due to the fact that the slave is the priority device on the multiplexed bus at this time and the slave is allowed to continually access the bus without interleaving message acknowledgements between requests until its queue is empty. Additionally, since the SCI is the default bus, there is no delay waiting for the TWB protocol to surrender bus control.

Figure 13A:
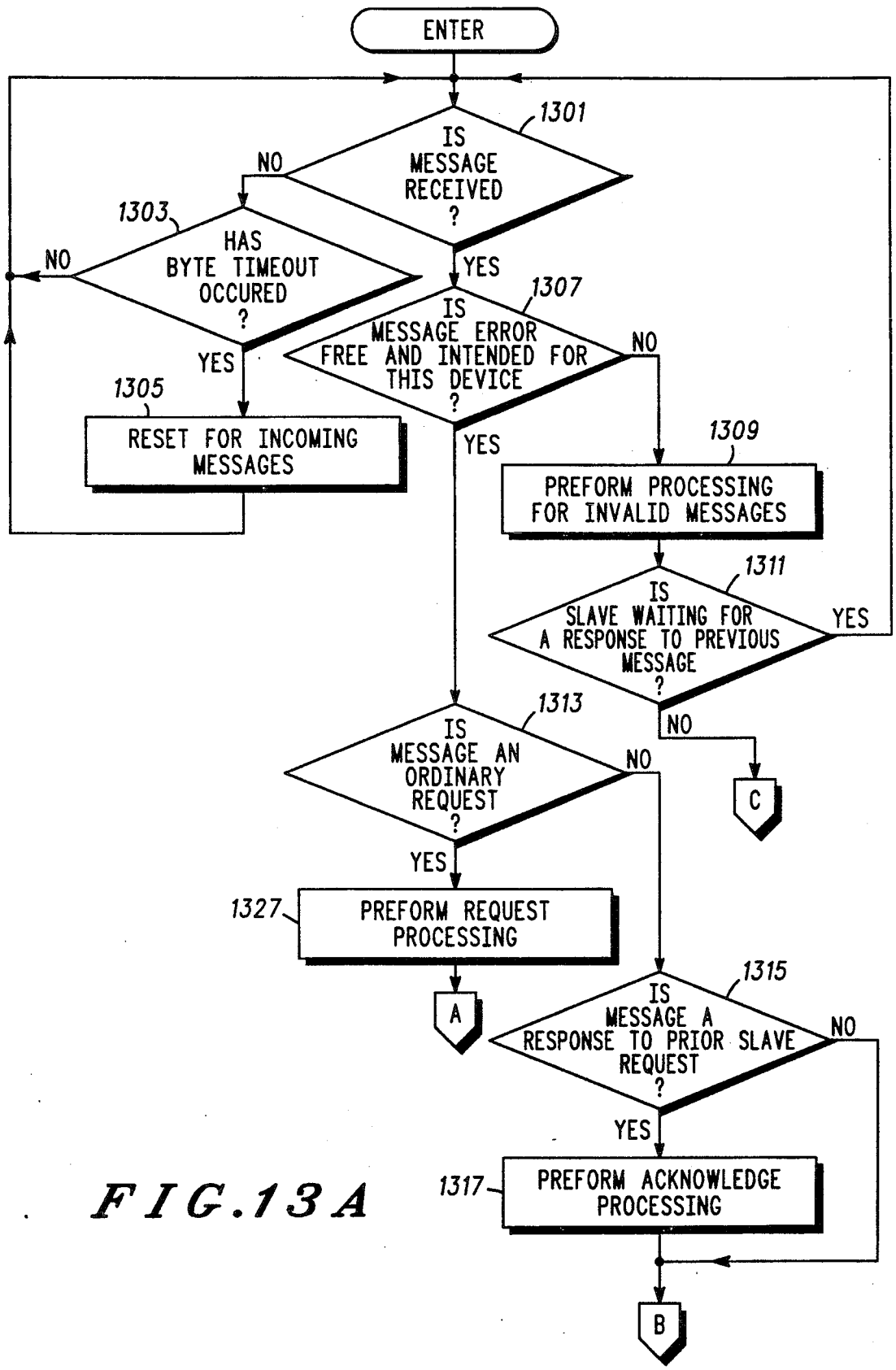
FIGS. 13(a) and 13(b) are flowchart of the process used by a slave using the SCI protocol data bus to receive messages from other devices.
Figure 13B:
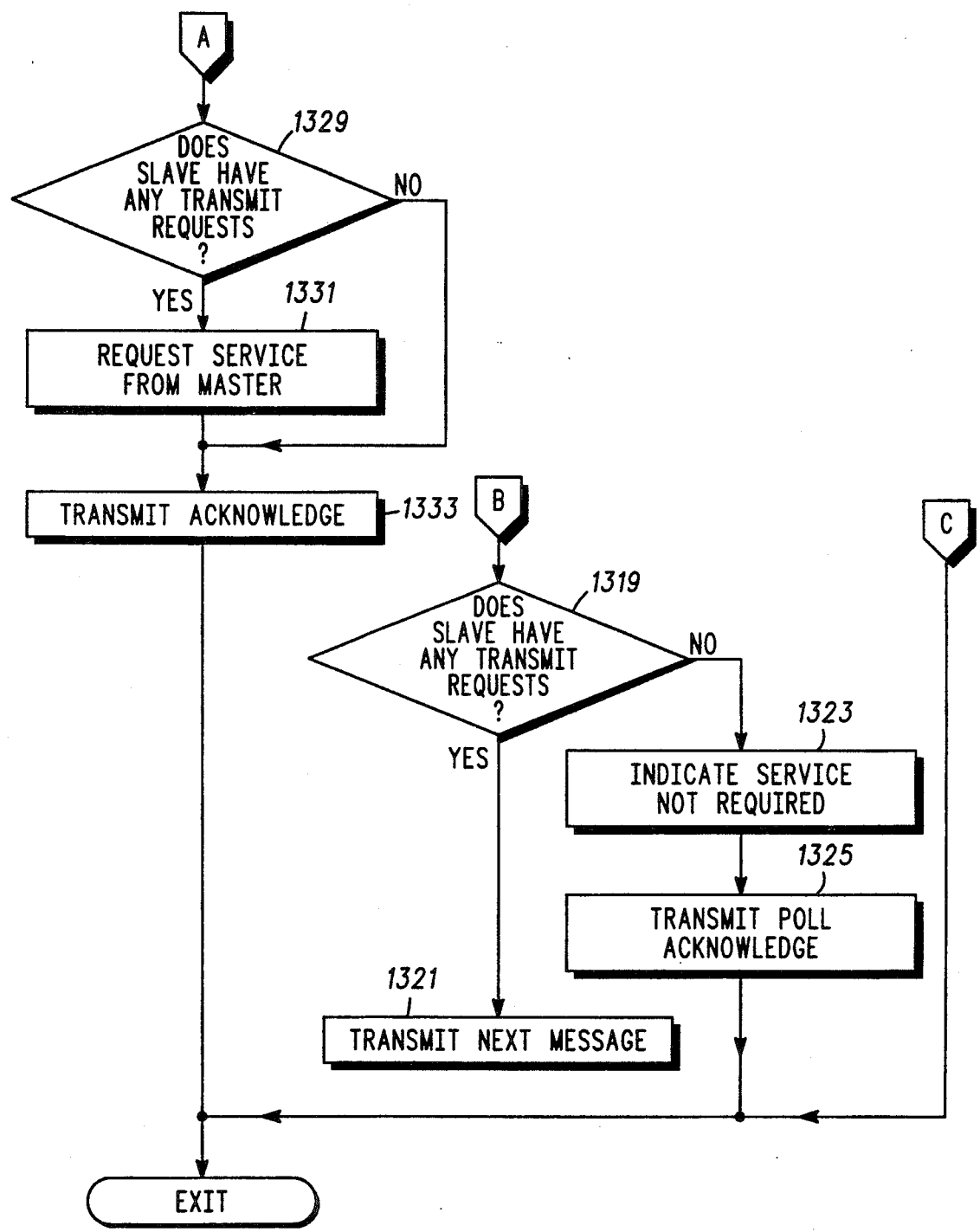

The response of the portable radiotelephone to high speed data data messages from the CVC peripheral (normally the bus master) is shown in the slave transmission process flowcharted in FIG. 12 and in the slave receive process flowcharted in FIG. 13. On power-up, the portable is considered the slave unit. The portable sets the input port, 807, of the TWB interface to a logic high and awaits high speed data which is coupled to microcomputer 736 via the RXD line. Upon detection of an address match the microcomputer 736 composes and transmits a data message response on the TXD line. At this time the CVC peripheral is the master of the SCI bus which controls the multiplexed bus throughout this power-up sequence. The C line is held at a logic high by the CVC peripheral in order to poll devices on the high speed serial data line (which is the multiplexed R line which can be high or low). In responding to a master message, the slave follows the process of FIG. 13. A determination is made, at 1301, whether a message has been received from the master and, if not, a byte time-out test (at 1030) and an incoming message process reset (at 1305) is performed before again attempting to determine if a message from the master has been received. If a message has been received from the master, a determination is made, at 1307, whether the received message is error free and addressed to the present slave. A message-containing an error or errors, or a message addressed to another slave peripheral is routed to an invalid message process, at 1309, before a test is made, at 1311, whether the present slave is waiting for a master's response to the slave's previous message. If the slave is waiting, the process returns to the message received test of block 1301; if the slave is not waiting, the slave receive process of FIG. 13 is exited.

Assuming that the received message is error free and addressed to the present slave, a test is made, at 1313, to determine whether the received message is an ordinary request, or whether the received message is a response to a prior slave request (determined at 1315). If the message is a response to a prior slave request, acknowledgement processing is performed, at 1317, before a test is made, at 1319, to determine if the slave has any requests to transmit. If the message is not a response to a prior slave request, the process of the preferred embodiment moves directly to the test of block 1319. The slave performs transmit processing on its next message, at 1321, if it has such a message or it indicates, at 1323, that service is not required and transmits a poll acknowledge, at 1325, before exiting the slave receive process.

The finding of an ordinary request message, at 1313, results in the processing of the request message, at 1327, and a determination, at 1329, of whether the slave has any requests of its own to transmit. If the slave does have a request to transmit, it requests service from the master, at 1331, before transmitting an acknowledge, at 1333. An acknowledge is also transmitted, but without a request for service from the master, if the slave does not have any requests to transmit. After the transmission of an acknowledge, at 1333, the slave receive process is exited.

Another requirement for the high speed SCI data bus is to transfer names and telephone numbers stored in the EEPROM 756 transferred to the RAM 764 in the CVC peripheral at power up. As the user modifies the memory locations, the CVC's RAM 764 is modified accordingly. In addition, any new information is also transmitted back to the portable in order to update the memory stored in the EEPROM 756 as well. In the previous implementations and even though the SCI protocol transmits at 20000 bits/sec, transferring this much information can still take a significant amount of time (approx. 5 seconds). During this time, the user is unable to use the radio. Also, the prior implementation of SCI protocol on a shared synchronous/asynchronous TWB required that each message request be responded to within a specified amount of time. When updating repertory names/numbers (and most other types of information), the new data sent to the portable had to be stored into the EEPROM 756. Because EEPROM writes can take up to 10 ms/byte, the specified response time for the message requesting the EEPROM 756 write can be easily exceeded. When such a timeout occurs, the portable could lock up due to continually trying to retransmit the same message. The present invention resolves a problem of EEPROM write completion delays which occur during individual repertory updates. A combination of an existing EEPROM write-in-progress flag and the SCI protocol's slave initiated request feature is utilized.

Therefore, a multiplexed synchronous/asynchronous bus employing the present invention searches through the repertory memory one location at a time and only those locations containing valid information are transmitted. In addition, it will not transmit the entire memory segment allocated to the location. It will only send those portions of the segment that contain information vital to the name and telephone number data.

Normally, when a response is received to a SCI message request, the data is processed and a valid message flag is set to indicate that a valid response has been received. All software tasks which have queued SCI messages watch for this flag to be set. Once set, the tasks check if the control code for the response just received matches the control code of the message request the task had previously queued. If so, the task knows the response it was looking for has come in. The task then clears the valid message flag and proceeds with normal operation. In the preferred embodiment, the CVC initiates the repertory transfer with an SCI message to the portable. The portable then searches until it finds a location with a valid number. Once a valid number location is found, the SCI transmit buffer is loaded with the name and phone number data, as well as the repertory location number and any memory linking pointers. This information is then transmitted to the CVC as the response to its repertory request. If the end of repertory is reached before the next valid location is found, then the data field portion of the message response will be empty. This will serve to indicate that all valid repertory locations have been transferred. When the CVC receives the response to the repertory request message, it will examine the contents of the data portion of the receive buffer. If it finds that the data field contains repertory information, it will store the name, number, etc., in the appropriate location in RAM 764. It will then automatically queue another SCI request for the next repertory location, while leaving the valid message flag clear. Leaving this flag clear prevents the task which originally requested the repertory transfer from prematurely thinking the transfer is complete. Additionally, the message transmitted for the next repertory request will contain the location number of the repertory information which was just received. When the portable receives the next request, it will use this location number as the starting point for its search for the next valid location. This process of automatically queueing the next repertory request will continue to occur until the CVC receives a repertory response in which the data field portion of the received message is empty. When the empty data field is received, the valid message flag will be set. This will indicate to the task which queued the request that the entire repertory transfer is complete. An additional feature of the present invention is that message response time is monitored internal to the SCI repertory message. If the response time is about to expire, searching will be temporarily halted. If the search process is halted for this reason, then the response back to the CVC will not contain any name or phone information. Rather, the response is to send the number of the last location searched prior to the search being halted. When the CVC receives the response containing only a location number, it will know that the search was stopped and that it must queue another SCI repertory location request. As before, it will transmit the location number just received, so the portable can use it as the starting point to continue the search. Also as before, a valid message flag will be left clear since there is more information to transfer.

Figure 14:
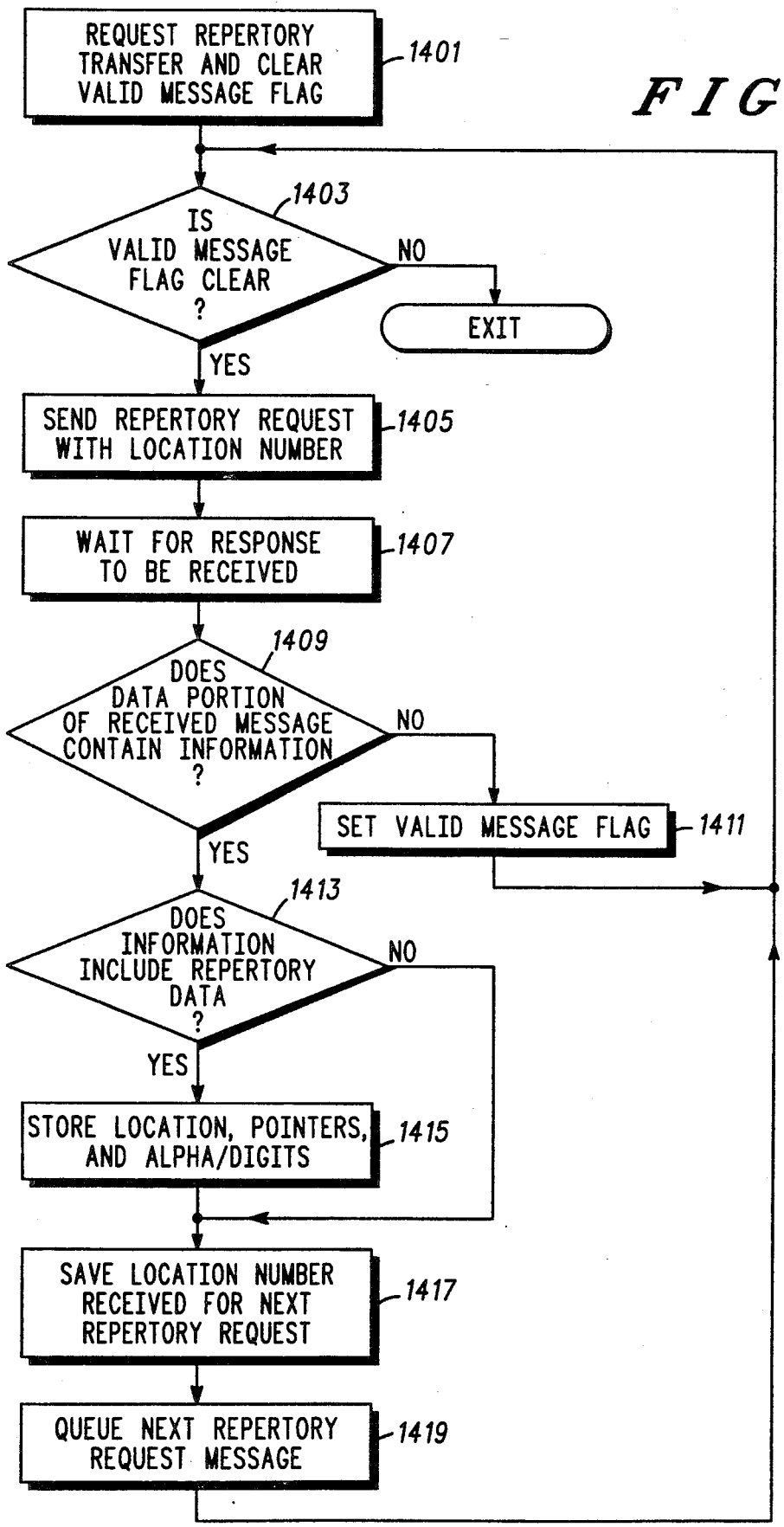
FIG. 14 is a flowchart of the process used by the CVC peripheral as the SCI protocol bus master to initiate and complete a transfer of repertory data from the portable radiotelephone.

Referring now to the flowchart of FIG. 14, the process followed by the CVC in transmitting, receiving, and processing a repertory transfer is shown. A request of repertory transfer and the clearing of a valid message flag occurs at 1401. If the valid message flag is clear, as determined at 1403, a repertory request with a location number is sent, at 1405, otherwise the process is exited. Following the sending of repertory request, the process, at 1407, waits for a response to be received from the slave (portable) unit. A test is then made, at 1409, to determine if the data portion of the received message contains valid information. If no valid information is detected, a valid message flag is set, at 1411, and the process returns to test whether a valid message flag has been set at 1403. If the data portion does contain information a further test, at 1413, is made to determine whether the information includes repertory data. If repertory data is found, the information is stored as location, pointers, and alpha/digits, at 1415. If the information does not include repertory data or after the transfer of location, pointers, and alpha/digits, has been completed, the process then saves the location number received for the next repertory request, at 1417. The next repertory request message is queued, at 1419, and the process returns to determine whether a valid message flag has been set.

Figure 15:
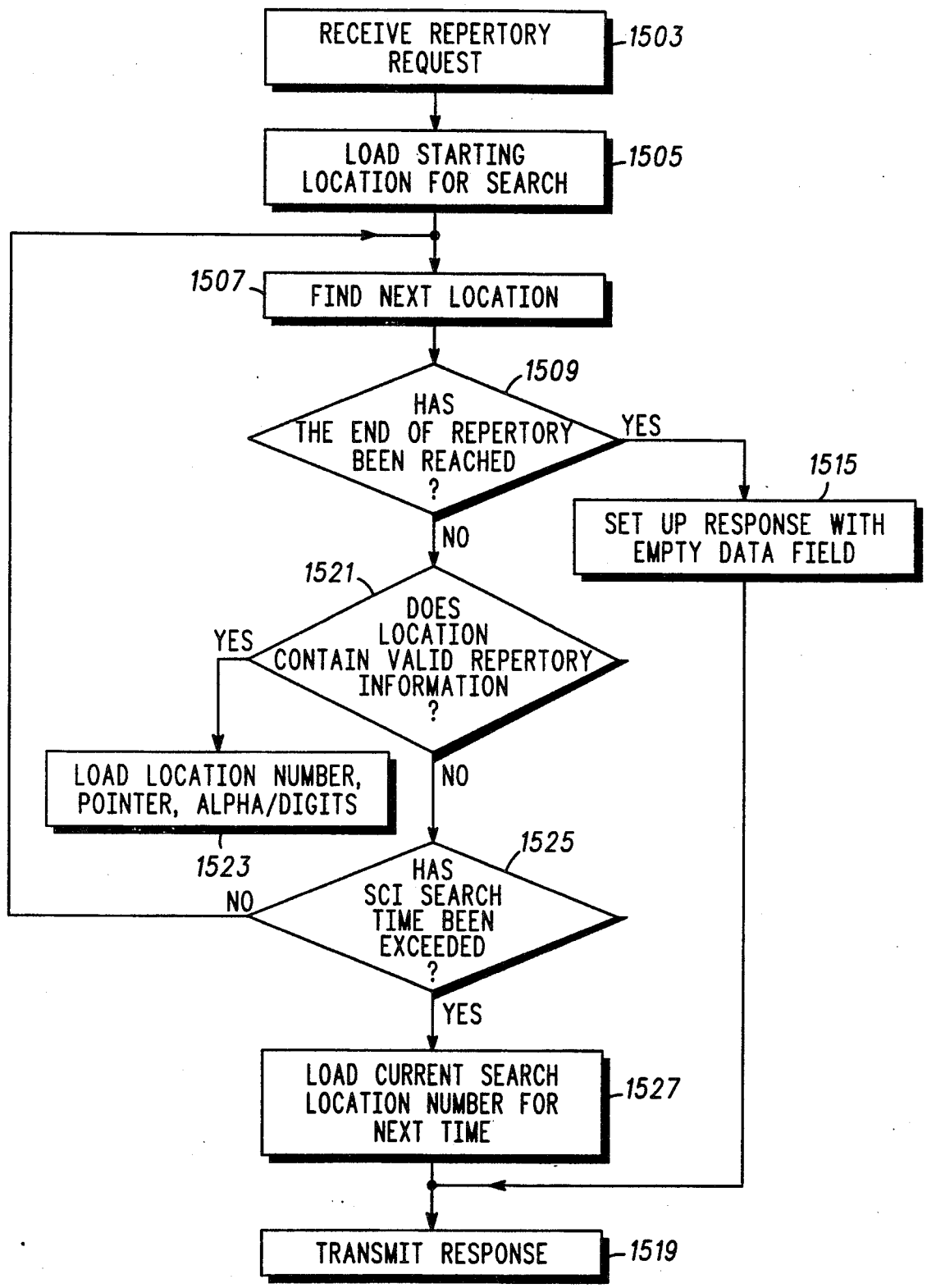
FIG. 15 is a flowchart of the process used by the portable radiotelephone as an SCI protocol bus slave to transfer repertory information to the CVC peripheral.

The response of the portable to a repertory number request is shown in the flowchart of FIG. 15. Upon the reception of a repertory request (at 1503) the starting location for the search is loaded at 1505. A finding of the next location is accomplished at block 1507 and a test of whether the end of repertory number transfer has been reached is made at 1509. A positive determination that the end of repertory number has been reached results in the setting up of a response with an empty data field, at 1515. This empty data field response is subsequently transmitted at 1519. If the end of repertory number transfer has not been reached, however, a test is made, at 1521, of whether the location contains valid repertory information. If valid repertory information is found, the location number, pointers, and alpha/digits are loaded, at 1523, before being transmitted, at 1519. If no valid repertory number information has been found, a determination, at 1525, is made to determine whether the SCI search time has been exceeded. If no, the process proceeds to block 1507, where the next location is found. If the SCI search time has been exceeded, the current search location number for the next time is loaded, at 1527, and a response is transmitted at 1519.

In previous designs using the SCI and TWB there exists a need for one device residing on the bus to be the busmaster. The busmaster is responsible for determining which bus (SCI or TWB) is in control at any given time. when the master assigns control to one bus, the second bus is effectively locked out and can not transmit any messages until the master gives the second bus control.

There can be only one master of the bus. However, there is a definite need for the ability to switch which device on the bus is actually the master. The previous approach for passing master control of the bus was implemented as follows:

1. The old master sends a pass control message to the slave device that is to become the new master.
2. The slave device receives the message, becomes the new master, and sends a response to the old master.
3. The old master receives the response, becomes a slave device, and sends a poll acknowledge to the new master.

The problem with the above technique is that a transmission error could occur while the new master is sending its pass control acknowledge to the old master. If this happens, the result will be two masters residing on the bus at the same time. As the two masters each try to retransmit their last message, bus contention will occur causing the radios to lock up and power down.

Therefore, to guarantee the existence of only one master on the bus at any given time, the preferred embodiment of the present invention operates as follows:

1. The old master sends a pass control message to the slave device that is to become the new master.
2. The salve device receives the message, but does not yet take on master status. For now, it simply enters a "Waiting to become Master" mode, and then sends the response to the pass control message.
3. If the old master receives the slave's pass control response correctly, then the old master will become a slave device. However, if the response form the slave is received incorrectly (or not at all), then the old master will remain the master of the bus and retransmit the pass control message to the slave again.
4. Meanwhile, the slave is in a waiting mode. If the slave device does not receive a retry of the pass control message within a specified amount of time, it will become the new master. However, if it does receive a retry, it will remain the slave and restart the "Waiting to become Master" process.

We claim:

1. A data transfer apparatus employing a data bus having a synchronous mode and an asynchronous mode for communication between a first memory unit and a second memory unit, comprising:
   means for determining a need for memory transfer;
   means, responsive to said means for determining, for searching a plurality of memory segments in the second memory unit for a valid data record stored in one of said plurality of memory segments;
   means for communicating said valid data record from the second data unit to the first memory unit in the asynchronous mode when said means for searching finds a valid data record; and
   means for communicating an empty data record from the second data unit to the first memory unit in the asynchronous mode when said means for searching does not find a valid data record.

2. A data transfer apparatus in accordance with claim 1 further comprising means for timing the time taken by said means for searching and means for halting said means for searching when a predetermined period of time has been exceeded.

3. A data transfer apparatus in accordance with claim 2 wherein said means for halting further comprises means for recording which of said plurality of memory segments was being searched by said means for searching when said means for searching was halted.

4. A data transfer apparatus in accordance with claim 3 further comprising means for communicating to the first memory unit which of said plurality of memory segments was being searched by said means for searching when said means for searching was halted.

5. A data transfer apparatus in accordance with claim 1 wherein said means for searching further comprises means for compressing the data of said valid data record before communication of said valid data record to the first memory means.

6. A data transfer apparatus in accordance with claim 1 further comprising means for granting priority to asynchronous mode communication over synchronous mode communication.

7. A data transfer apparatus in accordance with claim 1 further comprising means for accepting user-generated input and means for communicating said accepted user-generated input in the synchronous mode to the first memory unit.

8. A data transfer apparatus in accordance with claim 7 further comprising means for receiving said accepted user-generated input from the first memory unit communicated in the asynchronous mode.

9. A data transfer apparatus employing a data bus having a synchronous mode and an asynchronous mode for communication between a first memory unit and a second memory unit, comprising:
   means for determining a need for memory transfer;
   means for communicating said determined need for memory transfer in the asynchronous mode;
   means for receiving a message conveyed in the asynchronous mode from the second memory unit in response to said communicated need;
   means for interpreting said received message;
   means for storing information from said received message when a valid data record is interpreted from said received message; and
   means for saving a location number from said received message when a valid data record is not interpreted from said received message.

10. A data transfer apparatus in accordance with claim 9 further comprising means for ending memory transfer communication when said received message does not contain information.

11. A data transfer apparatus in accordance with claim 9 further comprising means for granting priority to asynchronous mode communication over synchronous mode communication.

12. A method of data transfer by a data bus having a synchronous mode and an asynchronous mode for communication between a first memory unit and a second memory unit, comprising the steps of:
   determining a need for memory transfer;
   searching a plurality of memory segments in the second memory unit for a valid data record stored in one of said plurality of memory segments in response to said determining step;
   communicating said valid data record from the second data unit to the first memory unit in the asychronous mode when said step of searching a plurality of memory segments finds a valid data record; and
   communicating an empty data record from the second data unit to the first memory unit in the asynchronous mode when said step of searching a plurality of memory segments does not yield a valid data record.

13. A method in accordance with the method of claim 12 further comprising the steps of timing the time taken by said means for searching and halting said searching step when a predetermined period of time has been exceeded.

14. A method in accordance with the method of claim 13 wherein said step of halting further comprises the step of recording which of said plurality of memory segments was being searched by said searching step when said searching was halted.

15. A method in accordance with the method of claim 14 further comprising the step of communicating to the first memory unit which of said plurality of memory segments was being searched by said searching step when said searching was halted.

16. A method in accordance with the method of claim 12 wherein said step of searching further comprises the step of compressing the data of said valid data record before communication of said valid data record to the first memory means.

17. A method in accordance with the method of claim 12 further comprising the step of granting priority to asynchronous mode communication over synchronous mode communication.

18. A method in accordance with the method of claim 12 further comprising the steps of accepting user-generated input and communicating said accepted user-generated input in the synchronous mode to the first memory unit.

19. A method in accordance with the method of claim 18 further comprising the step of receiving said accepted user-generated input from the first memory unit communicated in the asynchronous mode.

20. A method of data transfer by a data bus having a synchronous mode and an asynchronous mode for communication between a first memory unit and a second memory unit, comprising the steps of:
   determining a need for memory transfer;
   communicating said determined need for memory transfer in the asynchronous mode;
   receiving a message conveyed in the asynchronous mode from the second memory unit in response to said communicated need;
   interpreting said received message;
   storing information from said received message when a valid data record is interpreted from said received message; and
   saving a location number from said received message when a valid data record is not interpreted from said received message.

21. A method in accordance with the method of claim 20 further comprising the step of ending memory transfer communication when said received message does not contain information.

22. A method in accordance with the method of claim 20 further comprising the step of granting priority to asynchronous mode communication over synchronous mode communication.

* * * * *